US010353854B2

(12) United States Patent
Goldberger

(10) Patent No.: US 10,353,854 B2
(45) **Date of Patent: *Jul. 16, 2019**

(54) CLOUD PROGRAMMING SENSOR INTERFACE ARCHITECTURE

(71) Applicant: ORIGIN GPS LTD., Lod (IL)

(72) Inventor: Haim Goldberger, Modiin (IL)

(73) Assignee: ORIGIN GPS LTD., Lod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,074

(22) Filed: Jun. 26, 2018

(65) Prior Publication Data

US 2018/0300285 A1 Oct. 18, 2018

Related U.S. Application Data

(62) Division of application No. 15/682,590, filed on Aug. 22, 2017, now Pat. No. 10,037,300.

(60) Provisional application No. 62/378,233, filed on Aug. 23, 2016.

(51) Int. Cl.

| | |
|---|---|
| ***G01S 5/00*** | (2006.01) |
| ***G06F 13/42*** | (2006.01) |
| ***G05B 19/042*** | (2006.01) |
| ***G05B 19/418*** | (2006.01) |
| ***G01S 19/19*** | (2010.01) |
| *A63B 24/00* | (2006.01) |
| *A63B 43/00* | (2006.01) |
| *A63B 69/00* | (2006.01) |

(52) U.S. Cl.
CPC ........ *G06F 13/4282* (2013.01); *G01S 5/0027* (2013.01); *G01S 19/19* (2013.01); *G05B 19/0423* (2013.01); *G05B 19/4185* (2013.01); *A63B 24/0062* (2013.01); *A63B 43/00* (2013.01); *A63B 69/0002* (2013.01); *A63B 2220/12* (2013.01); *A63B 2220/30* (2013.01); *A63B 2220/40* (2013.01); *G05B 2219/25428* (2013.01); *G06F 2213/0016* (2013.01)

(58) Field of Classification Search
CPC ............... G06F 13/4282; G01S 5/0027; G05B 19/4185
See application file for complete search history.

(56) References Cited

U.S. PATENT DOCUMENTS 10,037,300 B2 * 7/2018 Goldberger ........ G05B 19/0423
2017/0146375 A1 * 5/2017 Luo ........................ H04L 67/10

* cited by examiner

*Primary Examiner* — Glenn A. Auve
(74) *Attorney, Agent, or Firm* — Soroker Agmon Nordman

(57) ABSTRACT

An integrated circuit for interfacing with one or more sensors including a wireless interface configured to connect to a network, an I/O interface configured to connect to sensors; and a microprocessor and memory that are programmed to: connect to a server via the network, wherein the server executes an application for controlling the sensors; transmit identification information and/or location information of the integrated circuit to the application executed by the server; receive commands for the sensors from the application executed by the server; and transfer the commands to the I/O interface for relaying to the sensors; and wherein the integrated circuit is configured to control any sensor that can connect electronically to the I/O interface without changing the programming of the microprocessor and memory.

16 Claims, 5 Drawing Sheets

300

310 COUNT

320 SRC

330 DES

340 CMD

350 CONTENT

CLOUD PROGRAMMING SENSOR INTERFACE ARCHITECTURE

RELATED APPLICATIONS

The present application is a Divisional of U.S. patent application Ser. No. 15/682,590 filed on Aug. 22, 2017, which claims priority from U.S. Provisional application No. 62/378,233 filed on Aug. 23, 2016, the disclosure of which is incorporated herein by reference.

FIELD OF THE INVENTION

The present invention relates generally to an integrated circuit for controlling sensors and more particularly to an integrated circuit that serves as a generic interface for controlling sensors by commands from a remote server, for example a cloud server.

BACKGROUND OF THE INVENTION

Many control systems use embedded integrated circuits for controlling sensors. The integrated circuits collect physical information, analyze the information and take actions in response to the analysis. For example a tracking device may have an embedded integrated circuit that accepts location measurements from a Global Navigation Satellite System (GNSS) and transmits the measurements over a mobile network to a user's mobile smartphone.

Likewise an irrigation system may include an embedded integrated circuit that is connected to sensors for determining soil conditions, temperature, water pressure and other details. The embedded integrated circuit analyzes the information from the sensors and activates irrigation based on the analysis. Similarly many other systems such as drones, cameras, pulse meters and the like also may include embedded integrated circuits.

Typically preparation of an embedded integrated circuit require extensive planning and is generally an expensive process. Additionally, if improvements are required or software errors are found it is generally complicated to upgrade the software, since every unit must be updated, for example by being reprogrammed, by replacing memory elements or by manufacturing a new version of the integrated circuit.

Likewise every embedded integrated circuit can only be used for the process for which it was programmed. Generally a change in the sensors requires reprogramming the embedded software.

SUMMARY OF THE INVENTION

An aspect of an embodiment of the invention, relates to an integrated circuit that serves as a universal interface for controlling sensors and/or sensor controllers. The sensors measure physical properties and the sensor controllers activate or deactivate physical systems. The integrated circuit is independent of the function of the sensors and sensor controllers making it simple to prepare the hardware for systems that control sensors.

The integrated circuit includes wireless communication ability to communicate with a network and an I/O interface to electrically connect with sensors or sensor controllers. Optionally, the integrated circuit includes a GNSS receiver to determine its location. The integrated circuit communicates with an application server on the network to serve as the provider of an application for controlling the sensors instead of using a sensor specific embedded program code in the integrated circuit. The software code embedded in the integrated circuit is generic and remains the same for all sensors connected to the integrated circuit.

The server executes an application that controls the activity of the sensors. The integrated circuit identifies itself to the server and may provide location information. The server provides commands for setting the sensors and/or for retrieving information from the sensors. The integrated circuit provides the commands to the sensors and/or sensor controllers. Data provided by the sensors is transmitted to the application on the server for analysis and for providing instructions in response to the data.

There is thus provided according to an exemplary embodiment of the disclosure, an integrated circuit for interfacing with one or more sensors, comprising:

a. a wireless interface configured to connect to a network;

b. an I/O interface configured to connect to sensors; and c. a microprocessor and memory that are programmed to:

Connect to a server via the network; wherein the server executes an application for controlling the sensors;

Transmit identification information and/or location information of the integrated circuit to the application executed by the server;

Receive commands for the sensors from the application executed by the server; and Transfer the commands to the I/O interface for relaying to the sensors; and Wherein the integrated circuit is configured to control any sensor that can connect electronically to the I/O interface without changing the programming of the microprocessor and memory.

In an exemplary embodiment of the disclosure, the integrated circuit includes a GNSS receiver to acquire location information of the integrated circuit. Optionally, the microprocessor is further programmed to receive data from the sensors responsive to the commands; and transmit the data to the server. In an exemplary embodiment of the disclosure, the integrated circuit supports any sensor that can interface electronically with the I/O interface without sensor specific embedded programming. Optionally, the I/O interface supports communication protocols selected from the group consisting of:

Universal Serial Bus (USB), Universal Asynchronous Receiver Transmitter (UART), Inter Integrated Circuit Bus ($I^2C$), Serial Peripheral Interface (SPI), and Serial General Purpose Input/output (SGPIO).

In an exemplary embodiment of the disclosure, the wireless interface supports connecting to the Internet over a cellular mobile network. Optionally, the commands accepted by the microprocessor from the server include sending a content to the sensors and requesting to receive content from the sensors. In an exemplary embodiment of the disclosure, the integrated circuit receives and relays commands with a different format sensors connected by different communication protocols. Optionally, a sub application can be accepted from the server to locally execute some or all of the functions of the application executed by the server. In an exemplary embodiment of the disclosure, remote workstations can control the sensors by accessing the application executed by the server.

There is further provided according to an exemplary embodiment of the disclosure, a method of controlling sensors, comprising:

Providing an integrated circuit comprising:

a. a wireless interface configured to connect to a network;

b. an I/O interface configured to connect to sensors; and c. a microprocessor and memory;

Programming the microprocessor to perform:

Connecting to a server via the network; wherein the server executes an application for controlling the sensors;

Transmitting identification information and/or location information of the integrated circuit to the application executed by the server;

Receiving commands for the sensors from the application executed by the server; and Transferring the commands to the I/O interface for relaying to the sensors; and Wherein the integrated circuit is configured to control any sensor that can connect electronically to the I/O interface without changing the programming of the microprocessor and memory.

In an exemplary embodiment of the disclosure, the integrated circuit includes a GNSS receiver to acquire location information of the integrated circuit. Optionally, the microprocessor is further programmed to receive data from the sensors responsive to the commands; and transmit the data to the server. In an exemplary embodiment of the disclosure, the integrated circuit supports any sensor that can interface electronically with the I/O interface without sensor specific embedded programming. Optionally, the I/O interface supports communication protocols selected from the group consisting of:

Universal Serial Bus (USB), Universal Asynchronous Receiver Transmitter (UART), Inter Integrated Circuit Bus ($I^2C$), Serial Peripheral Interface (SPI), and Serial General Purpose Input/output (SGPIO).

In an exemplary embodiment of the disclosure, the wireless interface supports connecting to the Internet over a cellular mobile network. Optionally, the commands accepted by the microprocessor from the server include sending a content to the sensors and requesting to receive content from the sensors. In an exemplary embodiment of the disclosure, the integrated circuit receives and relays commands with a different format for sensors connected by different communication protocols. Optionally, a sub application can be accepted from the server to locally execute some or all of the functions of the application executed by the server. In an exemplary embodiment of the disclosure, remote workstations can control the sensors by accessing the application executed by the server.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
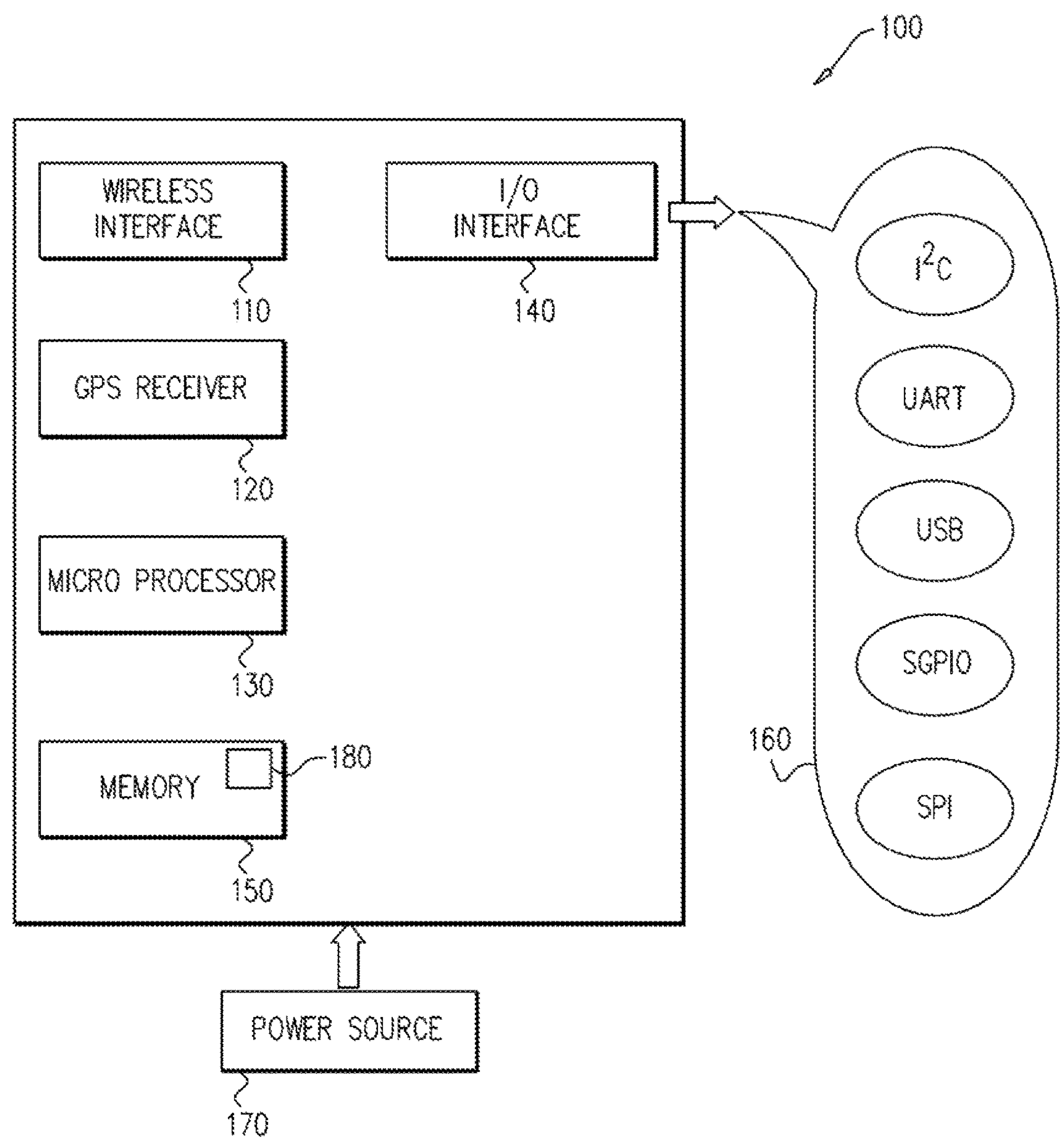
FIG. 1 is a schematic block diagram of an integrated circuit for controlling sensors, according to an exemplary embodiment of the disclosure.

FIG. 1 is a schematic block diagram of an integrated circuit 100 for controlling sensors, according to an exemplary embodiment of the disclosure. In an exemplary embodiment of the disclosure, integrated circuit 100 includes a wireless interface 110 for communicating wirelessly with a network. Optionally, the wireless interface 110 may communicate over a mobile cellular network (e.g. GSM, LTE) with a WAN, for example the Internet or an intranet. In some embodiments of the disclosure, the wireless interface 110 may support local short range wireless communication protocols to communicate with a Local Area Network (LAN), for example with Wi-Fi, Bluetooth or ZigBee instead of communicating over a mobile cellular network.

In an exemplary embodiment of the disclosure, integrated circuit 100 may include a GNSS receiver 120 for determining a physical location of the integrated circuit 100. In an exemplary embodiment of the disclosure, integrated circuit 100 includes a microprocessor 130 and a memory 150 for controlling the integrated circuit 100. Optionally, memory 150 may include a RAM and/or a ROM for storing and executing basic execution commands to control the integrated circuit 100. Optionally the ROM may include a non-volatile memory such as a flash memory. In an exemplary embodiment of the disclosure, integrated circuit 100 further includes an I/O interface 140 for communicating with sensors 250 and/or a sensor controller 240 (see FIG. 2). Optionally, the sensors 250 and sensor controller 240 may return measurements of physical parameters and/or control activation or deactivation of physical processes, for example activating or deactivating a light, water supply, taking measurements, recording data or other processes. In an exemplary embodiment of the disclosure, the I/O interface supports communicating using one or more communication protocols 160 such as Universal Serial Bus (USB), Universal Asynchronous Receiver Transmitter (UART), Inter Integrated Circuit Bus ($I^2C$), Serial Peripheral interface (SPI), Serial General Purpose Input/output (SGPIO) and/or other protocols. In an exemplary embodiment of the disclosure, integrated circuit 100 is configured to control the sensors by commands from an application 225 (see FIG. 2) on an application server 220 (see FIG. 2) instead of locally by an embedded application. Thus integrated circuit 100 is independent of the sensors connected. Optionally, a power source 170 (e.g. a battery) may be coupled to integrated circuit 100 to allow it to function independent of other elements of a system in which it is deployed. Alternatively or additionally, integrated circuit 100 may draw power from the sensors.

Figures 2, 3:
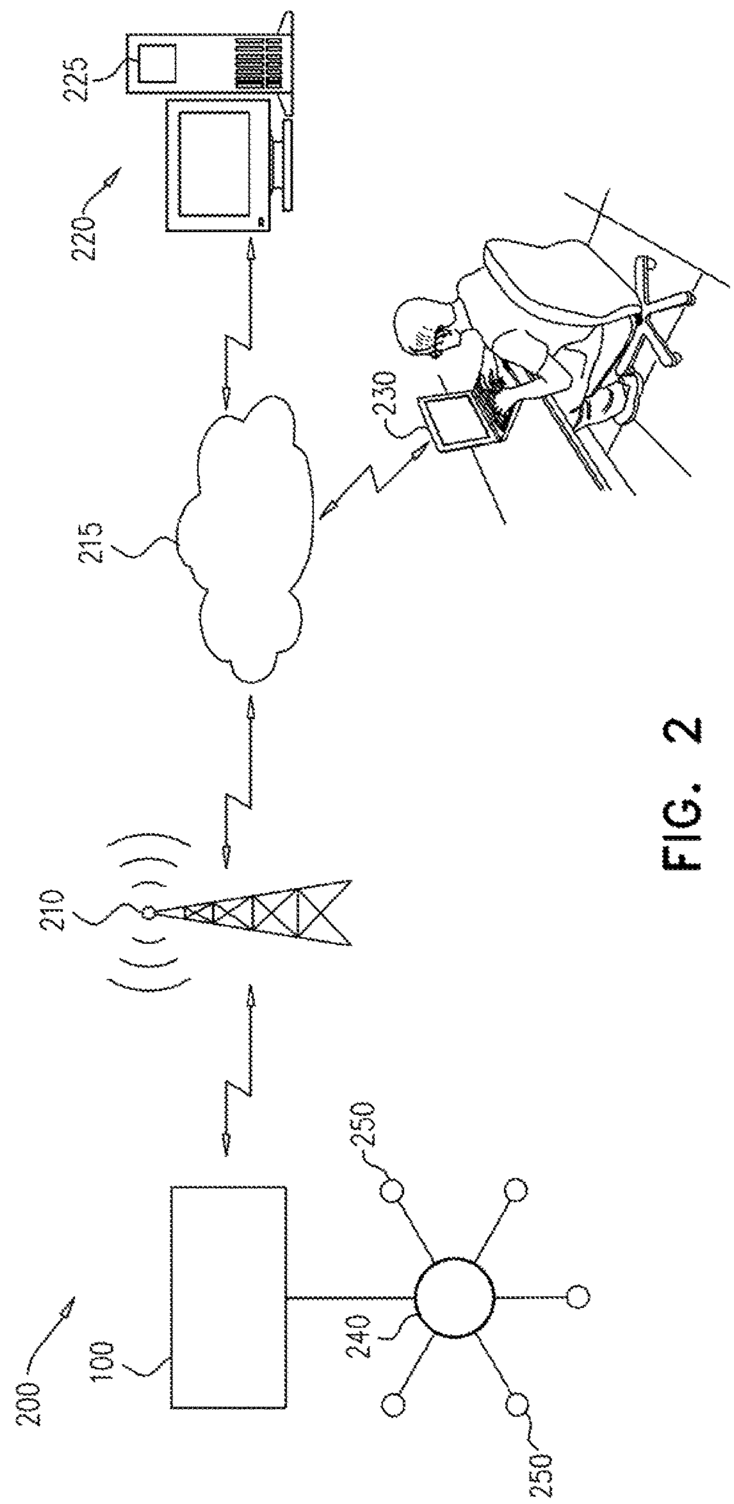
FIG. 2 is a schematic illustration of a system for deploying integrated circuit, according to an exemplary embodiment of the disclosure.
FIG. 3 is a schematic illustration of a command structure for commands from an application server to an integrated circuit or vice versa, according to an exemplary embodiment of the disclosure.

FIG. 2 is a schematic illustration of a system 200 for deploying integrated circuit 100, according to an exemplary embodiment of the disclosure. In an exemplary embodiment of the disclosure, integrated circuit 100 is initially configured to automatically connect to application server 220 to receive sensor specific commands from application 225 and is not controlled by an embedded sensor specific application. Optionally, when powered up integrated circuit 100 accesses server 220, for example via a mobile service provider 210 (or via a local Wi-Fi router) to communicate with a network 215 that will provide access to application server 220. The server may be a virtual server, for example a cloud server.

In an exemplary embodiment of the disclosure, integrated circuit 100 is initially configured with a unique identifier (e.g. a MAC number) and/or a unique IP address or domain name of application server 220 to access the application server 220 and identify itself when initially powered up. Integrated circuit 100 may additionally provide its location based on information from the GNSS receiver 120.

In an exemplary embodiment of the disclosure, integrated circuit 100 can be attached to any sensor 250 or sensor controller 240 that can connect electrically with the communication protocols supported by the integrated circuit 100, without preparing embedded software for the integrated circuit 100, thus simplifying preparation of hardware for embedded systems (since no programming is required within the integrated circuit 100). In the current disclosure the term sensor includes sensor controllers and any element that can measure physical properties and/or control physical systems and can communicate electronically with integrated circuit 100. For example a unit that can activate or deactivate machines and/or provide feedback relating to the status of the machines. In an exemplary embodiment of the disclosure, the sensors may include, a micro controller unit (MCU), a memory unit, a short range communication unit (e.g. Bluetooth), an encryption, module, accelerometer, compass, temperature sensor, light sensor, audio recorder, video recorder, speaker and other elements.

Optionally, programming is performed by providing an application 225 on server 220. In an exemplary embodiment of the disclosure, integrated circuit 100 merely relays information/data or commands from application server 220 to sensor controller 240 or sensors 250 and returns information/data from the sensor controller 240 or sensors 250 to application server 220. Optionally, server 220 analyzes the information/data and makes decisions based on the information/data.

In an exemplary embodiment of the disclosure, a remote workstation 230 can access the application 225 on application server 220 to receive data from sensors 250, either live data or data that was previously recorded by application 225 via communications with integrated circuit 100. Alternatively or additionally, remote workstation 230 can provide commands via application 225 to the sensors 250 or sensor controller 240 to control functionality of system 200, for example changing rules in application 225 or overriding rules. For example in an irrigation system changing the level of sensed soil humidity that is required for activating or deactivating the irrigation system, or immediately activating or deactivating the system.

In an exemplary embodiment of the disclosure, server 220 is a general purpose computer connected to the network 215 or a virtual server provided by a third party (e.g. a cloud server) hosting applications 225. Optionally, remote workstation 230 can be a general purpose computer, a laptop, a smartphone, a dedicated computing device or any other computing device having a processor and memory and the ability to communicate with server 220. In some embodiments of the disclosure, remote workstation 230 can be used to initially install application 225 on server 220 for a specific integrated circuit 100 or group of integrated circuits. Optionally, remote workstation 230 may use a dedicated application to access application 225 at server 220 or remote workstation 230 may use a standard browser application such as Google Chrome or Internet Explorer.

In an exemplary embodiment of the disclosure, the basic programming of integrated circuit 100 enables:

1. Connecting with an application server 220; wherein the server 220 executes application 225 for handling the sensors 250 and/or sensor controllers 240 of a specific integrated circuit 100 or group of integrated circuits 100.

2. Transmitting identification information of the integrated circuit 100 to the application server 220 and/or transmitting location information from the CLASS receiver 120 of the integrated circuit 100 to provide the location information to application server 220.

3. Receiving commands from the application server 220;

4. Forwarding the commands to the I/O interface 140 to relay them to a respective sensor 250 and/or sensor controller 240 via the correct communication protocol 160; and optionally:

5. Returning data from a respective sensor 250 and/or sensor controller 240 to application server 220 for application 225.

FIG. 3 is a schematic illustration of a command structure 300 for commands from application server 220 to integrated circuit 100 or vice versa, according to an exemplary embodiment of the disclosure. Optionally, the commands 300 includes a count 310 disclosing the length of the command 300, for example the number of bytes or bits in the command 300. Alternatively, delimiters may be used to signify the beginning and/or end of a command 300. The command may include a source address 320 and a destination address 330, for example the source may be the application server 220, integrated circuit identification or interface line no used for accessing the sensor. Optionally, the destination may be a specific sensor 250 via a specific communication protocol 160 line on I/O interface 140 (e.g. UART 2, sensor 3).

In an exemplary embodiment of the disclosure, the commands 340 include "set", "get", "rsp", "ack" and "ntfy", wherein:

1. "Set" provides a content 350 to the sensors 250 (e.g. relay commands to the sensors 250);

2. "Get" requests to fetch data from the sensors 250 based on the provided content;

3. "Rsp" signifies that the command is a response;

4. "Ack" signifies that the command is an acknowledgement notice signifying that the command was accepted successfully (e.g. has a correct syntax); and 5. "Ntfy" is a command that merely provides information to the destination.

Optionally, the content 350 is the actual commands for controlling the sensors 250 of which integrated circuit 100 is oblivious of. Generally, the content 350 depends on the type of sensor 250 and is provided by application 225 or sensors 250 in return.

In some embodiments of the disclosure, a sensor 250 may be designed or programmed to provide measurements periodically or to notify on occurrence of an event. Optionally, commands 300 may be used to report the data from the sensors 250 to application 225 on server 220.

In some embodiments of the disclosure, application 225 may download a sub application 180 to the memory 150 of integrated circuit 100. Optionally, the sub application 180 may be executed locally by microprocessor 130 to reduce bandwidth and/or support continuous operation of the sensors 250 in case of communication problems with network 215. In an exemplary embodiment of the disclosure, the sub application 180 may perform locally all the functions of application 225 or some of them. In some embodiments of the disclosure, a sub application 180 may be transferred to an external micro controller unit (MCU) that serves as an attached sensor. Optionally the sensor may provide instructions to other sensors via integrated circuit 100 to reduce communication throughput with server 220.

Figure 6:
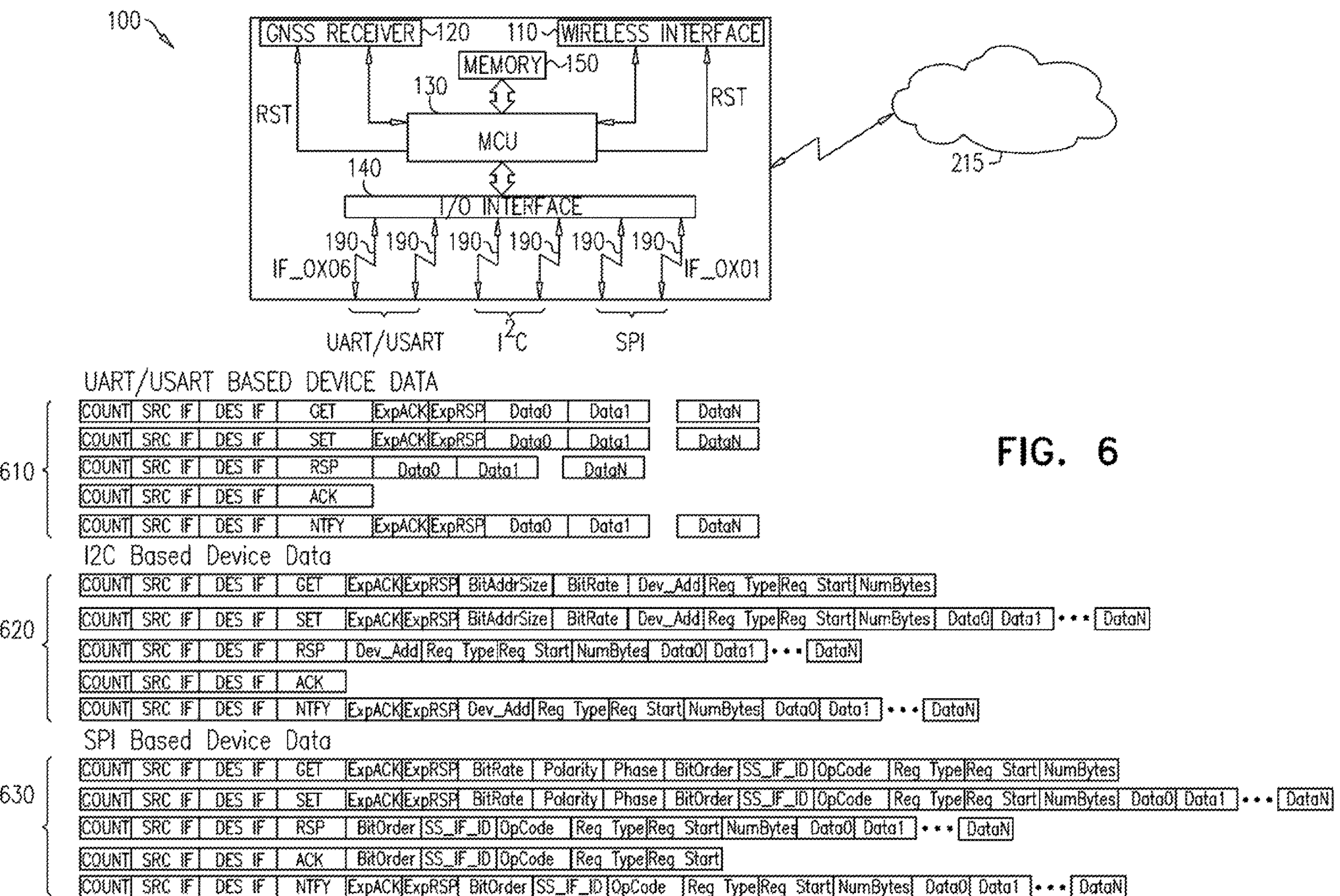
FIG. 6 is a schematic illustration of a layout of an exemplary integrated circuit and command formats for accessing various sensor interfaces, according to an exemplary embodiment of the disclosure.

FIG. 6 is a schematic illustration of a layout of an exemplary integrated circuit 100 and command formats (610, 620, 630) for accessing various sensor interfaces, according to an exemplary embodiment of the disclosure. In an exemplary embodiment of the disclosure, I/O interface 140 may be attached to microprocessor 130 or a part of microprocessor 130. An exemplary microprocessor includes Cortex STM 32L4 series by Stmicroelectronics LTD. Optionally, the microprocessor 130 or I/O interface 140 may include multiple communication lines 190 each supporting a specific communication protocol 160, for example a few lines supporting each of the following protocols: UART/USART, $I^2C$, SPI and/or other protocols 160.

In an exemplary embodiment of the disclosure, the commands used by application 225 may have a common part 300 (e.g. as explained above regarding FIG. 3) but be different for each communication protocol 160. For example the UART/USART commands may have the form shown as 610 in FIG. 6, $I^2C$ commands are shown by 620 and SPI commands are shown by 630. Optionally, other interfaces are generally similar to these three types or may have slight variations that are specific to the way that sensors 250 using the communication protocol 160 accept and transmit data.

In an exemplary embodiment of the disclosure, application 225 is designed to provide sensor control commands in the given format so that integrated circuit 100 can easily transfer the commands from application 225 to the sensors 250.

In an exemplary embodiment of the disclosure, UART/USART commands 610 (e.g. for Get and "Set" and "Ntfy") include a field signifying if the command expects an acknowledgement (ExpACK) indicating that the command is legal and a field signifying if the command expects a Response (ExpRSP). Afterwards data fields may be attached with the sensor specific information.

In an exemplary embodiment of the disclosure, $I^2C$ sensor commands 620 may include fields that are specific to $I^2C$ sensors such as bit address size, bit rate, device address, registry type, registry start and number of bytes to extract from the registries. Optionally, the fields used depend on the type of the command used as shown in FIG. 6.

In an exemplary embodiment of the disclosure, SPI commands 630 may include fields such as ExpACK, ExpRSP, bitrate, polarity, phase, bitorder, SS_IF_ID, Opcode, Reg Type, Reg start, Num bytes as are commonly used to communicate with SPI sensors.

Figure 4:
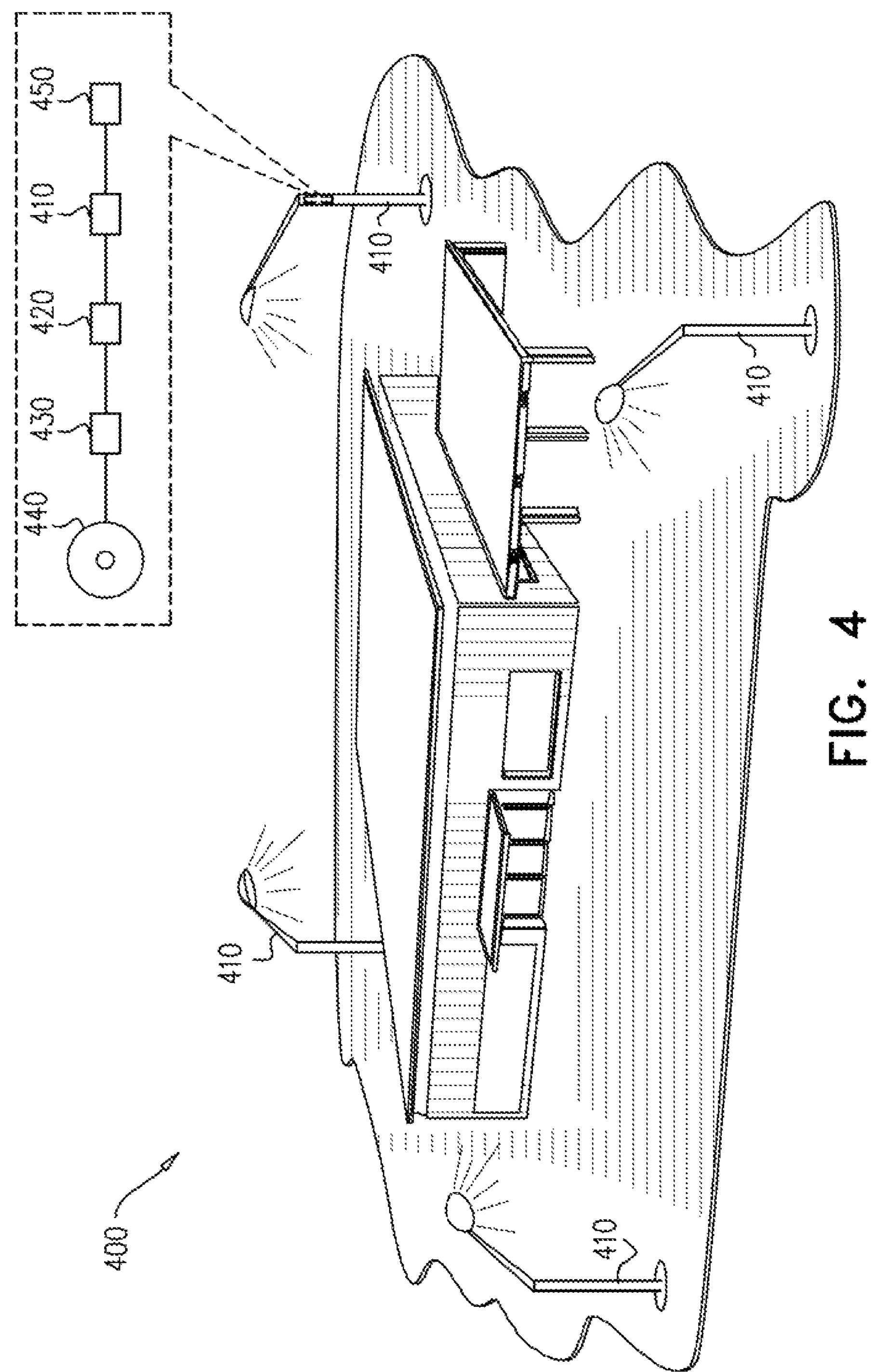
FIG. 4 is a schematic illustration of an exemplary system implemented by integrated circuits, according to an exemplary embodiment of the disclosure.

FIG. 4 is a schematic illustration of an exemplary system 400 implemented by integrated circuits 100, according to an exemplary embodiment of the disclosure. In an exemplary embodiment of the disclosure, system 400 serves as a smart lighting system for an estate, building, city or any other area comprising multiple light fixtures 410. Optionally, each light fixture includes an integrated circuit 100 for controlling the light fixture 410. Additionally, each light fixture includes a battery backup to enable communication with the light fixture when there is a power failure, for example integrated circuit 100 can notify application 225 that there is a power failure and that the light fixture 410 cannot be turned on. In an exemplary embodiment of the disclosure, each light fixture 410 includes a light sensor 420 to sense the lighting condition at the location of the fixture. The measurements of the light sensor can be used by application 225 to determine if the light fixture 410 should be turned on. Optionally, each light fixture includes a controllable switch 430 and a bulb 440, wherein the controllable switch can be instructed by application 225 to turn on the light fixture 410. In an exemplary embodiment of the disclosure, application 225 receives the location information and light conditions at each light fixture 410 and determines, which lights should be turned on and which should be turned off, for example to provide light to a specific location for a special event. Optionally, application 225 can turn on selective light fixture 410 depending on the lighting conditions, for example to save power or to turn on certain light fixtures 410 instead of non-functional light fixtures 410. Light sensor 420 may be used to determine if a specific bulb 440 is functional or partially functional so that application 225 may provide a report to a maintenance unit to fix malfunctioning light fixtures 410. Optionally, the report can provide the exact location and status of the light fixture, for example that a specific bulb 440 is blinking or burnt out.

In an exemplary embodiment of the disclosure, application 225 can use information from one location to decide on actions for systems in another location. For example in an irrigation system if it is raining in one location application 225 may defer watering other locations that are expected to receive rain within a day.

Integrated circuit 100 can be used for many types of applications in combination with different sensors. For example for monitoring the health of people or summoning help. Integrated circuit 100 can be connected to sensors that monitor blood pressure, heart rate, pulse rate, exercise/pedometer (e.g. an accelerometer and/or gyroscope or other sensors). Optionally, application 225 can identify individuals that are in need of assistance and contact them or dispatch a healthcare personnel to their location. Additionally, integrated circuit 100 can be used as a tracking device.

In some embodiments of the disclosure, one of the sensors 250 can be a buffer to store data, to reduce transmissions or combine transmissions to selected time intervals instead of continuously transmitting.

In some embodiments of the disclosure, microprocessor 130 can be programmed to shut down the GNSS receiver 120 or other units of the integrated circuit 100, for example to save power when a unit is not needed. Alternatively or additionally, microprocessor 130 can be programmed to enter a low powered mode automatically when not in use for an extended period.

Figure 5:
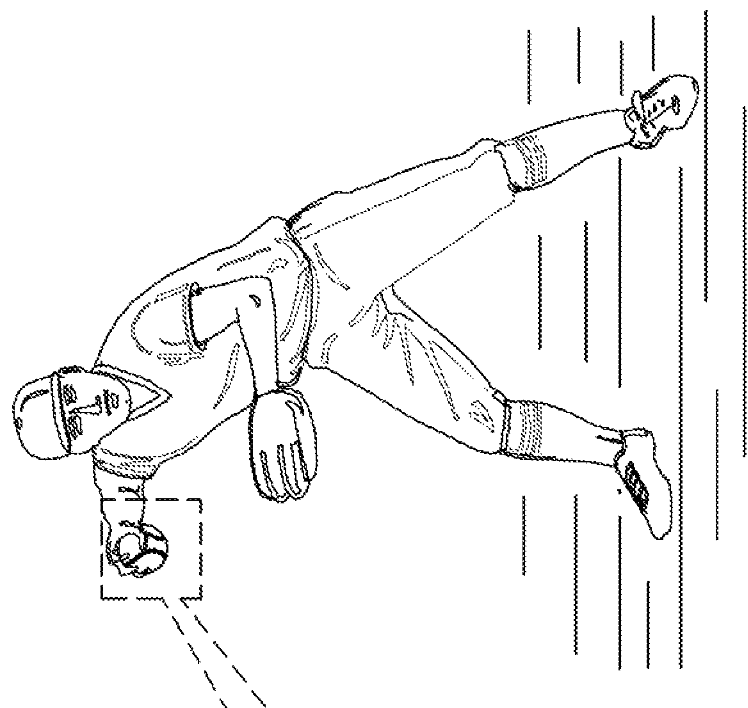
FIG. 5 is a schematic illustration of an alternative exemplary system implemented by an integrated circuit, according to an exemplary embodiment of the disclosure.
Figure 5:
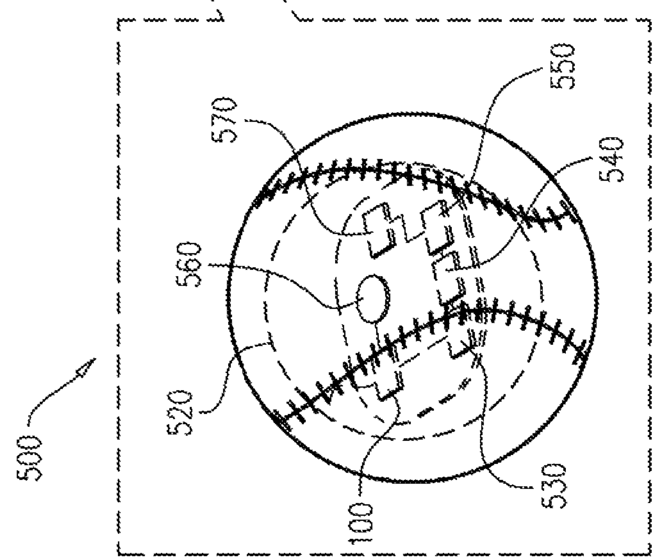

FIG. 5 is a schematic illustration of an alternative exemplary system 500 implemented by integrated circuits 100, according to an exemplary embodiment of the disclosure. System 500 tracks the quality of baseball pitches from within a ball 510. Optionally, a protective enclosure 520 is embedded within the ball 510. An integrated circuit 100 with a battery 560 is placed inside the enclosure 520 and connected to sensors 250 such as a 3-axis accelerometer 530, 3-axis gyroscope 540, 3-axis electronic compass 550 and Temperature sensor 570.

In an exemplary embodiment of the disclosure, the sensors 250 can identify a pitch and transmit the characteristics of the pitch to application 225 on server 220, for example the data can enable calculation of velocity, rotation, flight path, break and other parameters. Optionally, remote workstation 230 can be used to provide identification information of a pitcher and/or information related to the quality of the pitch of the pitcher. Application 225 can store the information of the pitches with the user provided information and provide accurate information of a pitchers ability.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. An integrated circuit for interfacing with one or more sensors, comprising:

a. a wireless interface configured to connect to a network;
b. an I/O interface configured to connect to sensors; and
c. a microprocessor and memory that are programmed to:
  connect to a server via the network; wherein said server executes an application for controlling the sensors;
  transmit identification information and/or location information of the integrated circuit to the application executed by the server;
  receive commands for the sensors from the application executed by the server; wherein the commands include a destination address identifying a specific sensor, a command type and a command content; wherein the command content is formatted to fit a format required by the specific sensor;
  transfer the command content as is to the I/O interface for relaying to the specific sensor; and
  return data from the sensors to the server based on the command type and provided command content.

2. The integrated circuit according to claim 1, wherein the integrated circuit includes a GNSS receiver to acquire location information of the integrated circuit.

3. The integrated circuit according to claim 1, wherein said integrated circuit supports any sensor that can interface electronically with the I/O interface without sensor specific embedded programming.

4. The integrated circuit according to claim 1, wherein the I/O interface supports communication protocols selected from the group consisting of:

Universal Serial Bus (USB), Universal Asynchronous Receiver Transmitter (UART), Inter Integrated Circuit Bus ($I^2C$), Serial Peripheral Interface (SPI), and Serial General Purpose Input/output (SGPIO).

5. The integrated circuit of claim 1, wherein the wireless interface supports connecting to the Internet over a cellular mobile network.

6. The integrated circuit of claim 1, wherein the integrated circuit receives and relays commands with a different format for sensors connected by different communication protocols.

7. The integrated circuit of claim 1, wherein the integrated circuit is configured to accept a sub application from the server to locally execute some or all of the functions of the application executed by the server.

8. The integrated circuit of claim 1, wherein remote workstations can control the sensors by accessing the application executed by the server.

9. A method of controlling sensors, comprising:

providing an integrated circuit comprising:
a. a wireless interface configured to connect to a network;
b. an I/O interface configured to connect to sensors; and
c. a microprocessor and memory;
Programming the microprocessor to perform:
  connecting to a server via the network; wherein said server executes an application for controlling the sensors;
  transmitting identification information and/or location information of the integrated circuit to the application executed by the server;
  receiving commands for the sensors from the application executed by the server; wherein the commands include a destination address identifying a specific sensor, a command type and command content; wherein the command content is formatted to fit a format required by the specific sensor;
  transferring the command content as is to the I/O interface for relaying to the specific sensor; and
  returning the data from the sensors to the server based on the command type and provided command content.

10. The method according to claim 9, wherein the integrated circuit includes a GNSS receiver to acquire location information of the integrated circuit.

11. The method according to claim 9, wherein said integrated circuit supports any sensor that can interface electronically with the I/O interface without sensor specific embedded programming.

12. The method according to claim 9, wherein the I/O interface supports communication protocols selected from the group consisting of:

Universal Serial Bus (USB), Universal Asynchronous Receiver Transmitter (UART), Inter Integrated Circuit Bus ($I^2C$), Serial Peripheral Interface (SPI), and Serial General Purpose Input/output (SGPIO).

13. The method according to claim 9, wherein the wireless interface supports connecting to the Internet over a cellular mobile network.

14. The method according to claim 9, wherein the integrated circuit receives and relays commands having a different format for sensors connected by different communication protocols.

15. The method according to claim 9, wherein the integrated circuit is configured to accept a sub application from the server to locally execute some or all of the functions of the application executed by the server.

16. The method according to claim 9, wherein remote workstations can control the sensors by accessing the application executed by the server.

* * * * *